United States Patent
Nakai et al.

(10) Patent No.: US 9,551,339 B2
(45) Date of Patent: Jan. 24, 2017

(54) ELECTROMAGNETIC PUMP WITH A STRAINER MOUNTED ONTO THE INLET OF THE SUCTION VALVE

(75) Inventors: Masaya Nakai, Fokoname (JP); Kota Fukao, Ichinomiya (JP); Noriomi Fujii, Toyota (JP)

(73) Assignee: AISIN AW CO., LTD., Anjo (JP)

( * ) Notice: Subject to any disclaimer, the term of this patent is extended or adjusted under 35 U.S.C. 154(b) by 345 days.

(21) Appl. No.: 14/124,618

(22) PCT Filed: Jul. 23, 2012

(86) PCT No.: PCT/JP2012/068553
§ 371 (c)(1),
(2), (4) Date: Dec. 6, 2013

(87) PCT Pub. No.: WO2013/027517
PCT Pub. Date: Feb. 28, 2013

(65) Prior Publication Data
US 2014/0099220 A1    Apr. 10, 2014

(30) Foreign Application Priority Data
Aug. 24, 2011 (JP) .................................. 2011-183004

(51) Int. Cl.
*F04B 53/20* (2006.01)
*F04B 17/04* (2006.01)
(Continued)

(52) U.S. Cl.
CPC .............. *F04B 53/20* (2013.01); *B01D 35/02* (2013.01); *B01D 35/306* (2013.01); *F04B 17/042* (2013.01)

(58) Field of Classification Search
CPC ................. F04B 17/04–17/044; F04B 17/046; F04B 35/045; F04B 53/20; F04B 53/22; F04B 53/126; F04B 53/005; F16H 61/0031; F16H 61/0206; H02K 44/04; H02K 44/06; A61M 5/14236; B01D 35/02; B01D 35/157; B01D 35/30; B01D 35/306; B01D 2201/305; B01D 2201/16; B01D 2201/162; B01D 2201/04; B01D 2201/0415
(Continued)

(56) References Cited

U.S. PATENT DOCUMENTS 4,047,852 A    9/1977    O'Connor et al.
5,836,350 A    11/1998    Sakaguchi et al.
(Continued)

FOREIGN PATENT DOCUMENTS

DE    764 086 C    6/1953
DE    1 028 428 B    4/1958
(Continued)

OTHER PUBLICATIONS

International Search Report issued in International Patent Application No. PCT/JP2012/068553 mailed Oct. 16, 2012.

*Primary Examiner* — William H Rodriguez
*Assistant Examiner* — Christopher Brunjes
(74) *Attorney, Agent, or Firm* — Oliff PLC

(57) ABSTRACT

An electromagnetic pump configured with an electromagnetic portion that generates an electromagnetic force for pressing the piston, and an urging member that urges the piston in a direction opposite to the electromagnetic force. A strainer member including a disk-shaped portion which has a disk shape and in which a strainer surface is formed, and a side portion that extends from an outer peripheral edge of the disk-shaped portion. A suction check valve being capable of sucking the working fluid via the strainer surface. The piston, the urging member, the suction check valve, and
(Continued)

the strainer member are sequentially inserted into the cylinder from a side opposite to the electromagnetic portion, and the cover member is attached so as to press the strainer surface.

8 Claims, 4 Drawing Sheets

(51) Int. Cl.
  *B01D 35/02* (2006.01)
  *B01D 35/30* (2006.01)
(58) Field of Classification Search
  USPC .................. 417/459, 495, 523, 554; 137/550
  See application file for complete search history.

(56) References Cited

U.S. PATENT DOCUMENTS

| | | |
|---|---|---|
| 5,934,766 A | 8/1999 | Feigel et al. |
| 8,043,072 B2 | 10/2011 | Maeda et al. |
| 2004/0022651 A1* | 2/2004 | Hashimoto ........... F04B 17/046 417/417 |
| 2007/0183911 A1* | 8/2007 | Maeda ................. B60T 8/4031 417/470 |
| 2008/0063547 A1 | 3/2008 | Priem et al. |
| 2009/0120967 A1* | 5/2009 | Bensley .................... F04B 9/02 222/333 |
| 2010/0215530 A1* | 8/2010 | Schmautz ............ B60T 8/4031 417/554 |
| 2011/0293449 A1 | 12/2011 | Shimizu et al. |
| 2012/0006423 A1* | 1/2012 | Wu ........................ F04D 13/10 137/343 |

FOREIGN PATENT DOCUMENTS

| | | | |
|---|---|---|---|
| DE | 27 34 859 A1 | 2/1978 | |
| DE | 44 41 150 A1 | 5/1996 | |
| DE | 199 25 250 A1 | 12/2000 | |
| DE | 19925250 A1 * | 12/2000 | ............ B60T 8/4031 |
| DE | 10 2007 000 071 A1 | 8/2007 | |
| DE | 196 31 631 B4 | 1/2009 | |
| DE | 10 2008 013 440 A1 | 9/2009 | |
| EP | 2 379 886 B1 | 5/2012 | |
| JP | U-58-51079 | 4/1983 | |
| JP | A-2002-39057 | 2/2002 | |
| JP | 2003-028339 A | 1/2003 | |
| JP | WO 2010146952 A1 * | 12/2010 | ............ F04B 17/044 |
| JP | A-2011-1843 | 1/2011 | |
| JP | A-2011-21532 | 2/2011 | |
| JP | A-2011-21593 | 2/2011 | |

\* cited by examiner

ELECTROMAGNETIC PUMP WITH A STRAINER MOUNTED ONTO THE INLET OF THE SUCTION VALVE

INCORPORATION BY REFERENCE

The disclosure of Japanese Patent Application No. 2011-183004 filed on Aug. 24, 2011 including the specification, drawings and abstract is incorporated herein by reference in its entirety.

BACKGROUND OF THE INVENTION

The present invention relates to an electromagnetic pump in which a piston moves back and forth within a cylinder to pump a working fluid.

DESCRIPTION OF THE RELATED ART

Hitherto, there has been proposed an electromagnetic pump of this type, including a cylinder having a hollow cylindrical shape, a piston that moves back and forth within the cylinder, an electromagnetic portion that generates an electromagnetic force that moves the piston forward, a spring that moves the piston backward, a suction check valve disposed on an end surface of the cylinder, and a discharge check valve built in the piston (see Patent Document 1: Japanese Patent Application Publication No. 2011-21593 (JP 2011-21593 A), for example). In the electromagnetic pump, a space surrounded by the cylinder, the suction check valve, and the piston (discharge check valve) is used as a pump chamber, and the piston is moved back and forth using an electromagnetic force and thrust of the spring to pump working oil.

SUMMARY OF THE INVENTION

For electromagnetic pumps, it is common to dispose a strainer so that foreign matter such as dust does not enter the pump chamber. In this case, it is conceivable to dispose the strainer at a suction port of the suction check valve. If the electromagnetic pump is small in size, however, the size of the strainer should also be small, which makes it difficult to assemble the strainer.

It is a main object of the electromagnetic pump according to the present invention to further improve the ease of assembly.

In order to achieve the foregoing main object, the electromagnetic pump according to the present invention adopts the following means.

According to an aspect of the present invention, an electromagnetic pump in which a piston moves back and forth within a cylinder to pump a working fluid includes:

an electromagnetic portion that generates an electromagnetic force for pressing the piston;

an urging member that urges the piston in a direction opposite to the electromagnetic force;

a strainer member including a disk-shaped portion which has a disk shape and in which a strainer surface is formed, and a side portion that extends from an outer peripheral edge of the disk-shaped portion;

a suction check valve including a placement portion which is formed in a tubular shape and over which the strainer member is placed such that the side portion surrounds a tube side surface, the suction check valve being capable of sucking the working fluid via the strainer surface; and a cover member that covers an end portion of the cylinder, in which the piston, the urging member, the suction check valve, and the strainer member are sequentially inserted into the cylinder from a side opposite to the electromagnetic portion, and the cover member is attached so as to press the strainer surface.

In the electromagnetic pump according to the aspect of the present invention the strainer member is formed to include the disk-shaped portion which has a disk shape and in which the strainer surface is formed, and the side portion that extends from the outer peripheral edge of the disk-shaped portion. The suction check valve is formed to include the placement portion which has a tubular shape and over which the strainer member is placed such that the side portion of the strainer member surrounds the tube side surface. The piston, the urging member, the suction check valve, and the strainer member are sequentially inserted into the cylinder from a side opposite to the electromagnetic portion, and the cover member is attached so as to press the strainer surface. This allows the strainer member to be easily assembled and aligned with respect to the suction check valve even in the case where the strainer member is small in size. As a result, it is possible to further improve the ease of assembly of the electromagnetic pump.

In the electromagnetic pump according to the above aspect of the present invention, the strainer member may be disposed inside the cylinder with the strainer member assembled to the suction check valve. In the electromagnetic pump according to this aspect of the present invention, the suction check valve may include a stepped tubular member formed with a first tubular member that is tubular, and a second tubular member that is tubular and that is formed with the placement portion, the second tubular member being larger in outside diameter than the first tubular member; the side portion may be formed with clips that are bent inwardly of an outer periphery of the second tubular member; and the strainer member may be assembled to the suction check valve with the clips engaged with a step of the stepped tubular member. With this configuration, it is possible to prevent the strainer member from slipping off when the strainer member is placed on the suction check valve, further improving the ease of assembly of the electromagnetic pump. In the electromagnetic pump according to this aspect of the present invention, the clips of the strainer member may be engaged with the step of the stepped tubular member with a predetermined clearance provided in a direction orthogonal to a surface of the disk-shaped portion. With this configuration, the cover member can press the abutment surface of the strainer member with a uniform pressure when the cover member is attached.

In the electromagnetic pump according to the aspect of the present invention, the suction check valve may include a main body that has a hollow portion and that supports the urging member with a piston-side surface, a ball and a second urging member disposed in the hollow portion, and a plug that serves as a seat portion for the ball and that is press-fitted into the hollow portion with the ball and the second urging member disposed in the hollow portion; and the placement portion may be formed on the plug.

The electromagnetic pump according to the aspect of the present invention may further include a discharge check valve that is built in the piston and that is capable of discharging the working fluid sucked via the suction check valve, and the piston may be disposed in the cylinder with the discharge check valve assembled to the piston. With this configuration, it is possible to easily dispose the piston and the discharge check valve inside the cylinder, further improving the ease of assembly of the electromagnetic pump.

In the electromagnetic pump according to the aspect of the present invention, the side portion may be formed as a plurality of leg portions provided at predetermined intervals to surround the tube side surface of the placement portion. In the electromagnetic pump according to this aspect of the present invention, the disk-shaped portion may be formed with notched grooves that extend in a radial direction from the outer peripheral edge; and the leg portions may be formed to extend from the notched grooves. With this configuration, it is possible to easily bend the leg portions of the strainer member from the outer peripheral edge of the disk-shaped portion.

DETAILED DESCRIPTION OF THE EMBODIMENTS

An embodiment of the present invention will be described below.

Figure 1:
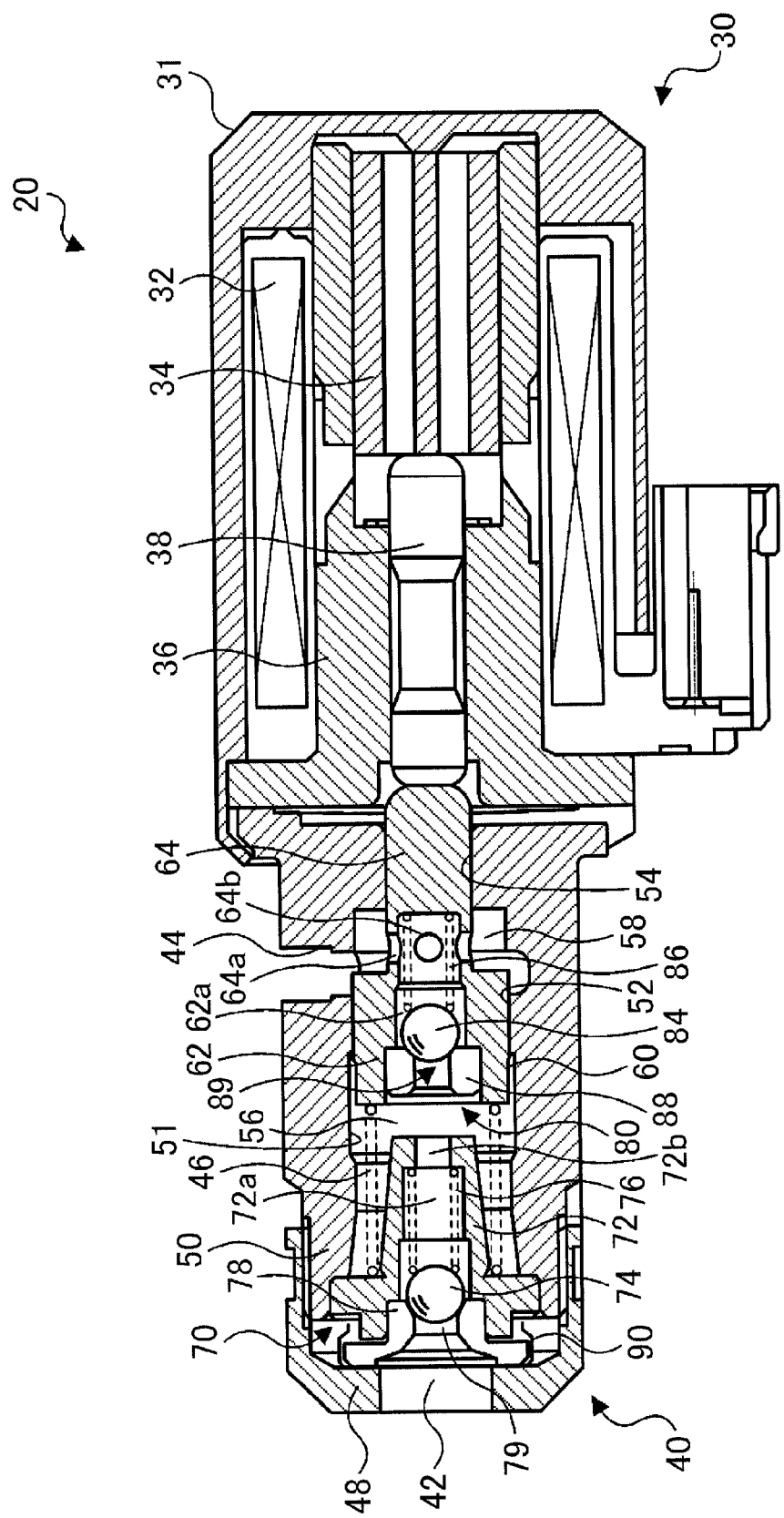
FIG. 1 is a diagram showing a schematic configuration of an electromagnetic pump 20 according to an embodiment of the present invention.

FIG. 1 is a diagram showing a schematic configuration of an electromagnetic pump 20 according to an embodiment of the present invention. The electromagnetic pump 20 according to the embodiment includes a solenoid portion 30 that generates an electromagnetic force, and a pump portion 40 actuated by the electromagnetic force of the solenoid portion 30. The electromagnetic pump 20 may be formed as a part of a hydraulic control device provided in a vehicle incorporating an engine and an automatic transmission to hydraulically drive friction engagement elements (clutches and brakes) included in the automatic transmission.

The solenoid portion 30 includes a solenoid case 31 that is a bottomed cylindrical member, an electromagnetic coil 32, a plunger 34 that serves as a movable element, and a core 36 that serves as a stationary element. The electromagnetic coil 32, the plunger 34, and the core 36 are disposed in the solenoid case 31. In the solenoid portion 30, a current is applied to the electromagnetic coil 32 to form a magnetic circuit in which magnetic flux circulates through the solenoid case 31, the plunger 34, and the core 36, and the plunger 34 is attracted to push out a shaft 38 provided in abutment with the distal end of the plunger 34.

The pump portion 40 is formed as a piston pump that moves a piston 60 back and forth using the electromagnetic force from the solenoid portion 30 and the urging force of a spring 46 to pump working oil. The pump portion 40 includes: a cylinder 50 having a hollow cylindrical shape with its one end joined to the solenoid case 31 of the solenoid portion 30; the piston 60 slidably disposed within the cylinder 50 with its base end surface coaxially abutting against the distal end of the shaft 38 of the solenoid portion 30; the spring 46 that abuts against the distal-end surface of the piston 60 to urge the piston 60 in the direction opposite to the direction in which the electromagnetic force from the solenoid portion 30 is applied; a suction check valve 70 that supports the spring 46 from the side opposite to the distal-end surface of the piston 60, that permits working oil to flow in the direction of being sucked into a pump chamber 56, and that prohibits working oil to flow in the opposite direction; a strainer 90 disposed at the suction port of the suction check valve 70 to trap foreign matter such as dust contained in sucked working oil; a discharge check valve 80 that is built in the piston 60, that permits working oil to flow in the direction of being discharged from the pump chamber 56, and that prohibits working oil to flow in the opposite direction; and a cylinder cover 48 that covers the other end of the cylinder 50 with the piston 60, the discharge check valve 80, the spring 46, and the suction check valve 70 disposed inside the cylinder 50. In the pump portion 40, a suction port 42 is formed at the axial center of the cylinder cover 48, and a discharge port 44 is formed by cutting away a part of the side surface of the cylinder 50 in the circumferential direction.

The piston 60 is formed in a stepped shape with a piston main body 62 having a cylindrical shape, and a shaft portion 64 having a cylindrical shape with its end surface in abutment with the distal end of the shaft 38 of the solenoid portion 30 and being smaller in outside diameter than the piston main body 62. The piston 60 moves back and forth within the cylinder 50 in conjunction with the shaft 38 of the solenoid portion 30. A bottomed hollow portion 62a having a cylindrical shape is formed at the axial center of the piston 60. The discharge check valve 80 is disposed in the hollow portion 62a. The hollow portion 62a extends from the distal-end surface of the piston 60 through the inside of the piston main body 62 to a middle of a space inside the shaft portion 64. The shaft portion 64 is formed with two through holes 64a and 64b that intersect each other at an angle of 90 degrees in the radial direction. The discharge port 44 is formed around the shaft portion 64. The hollow portion 62a communicates with the discharge port 44 via the two through holes 64a and 64b.

Figure 2:
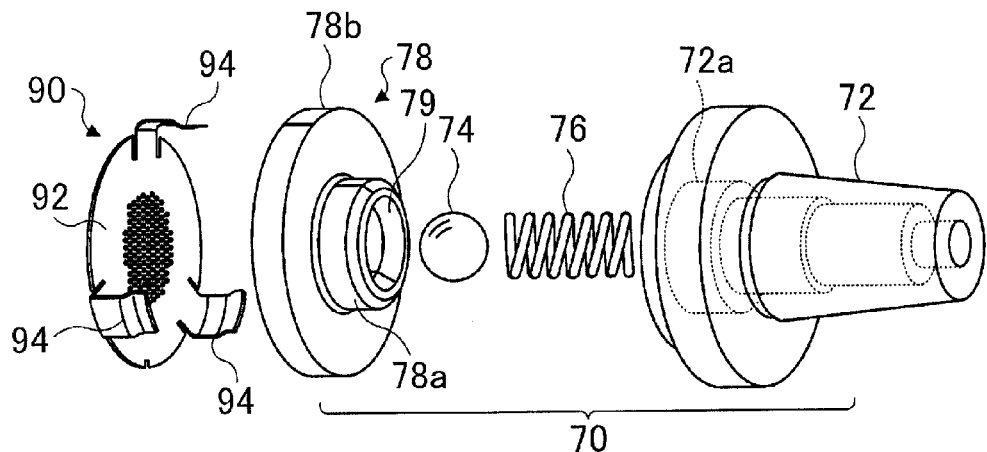
FIG. 2 illustrates how a suction check valve 70 is assembled.
Figure 3:
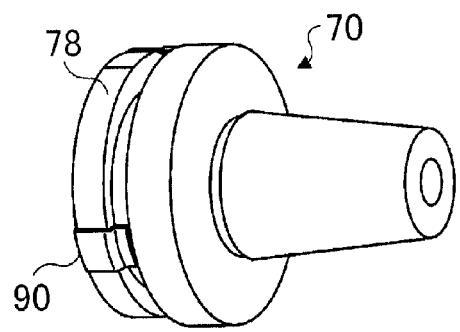
FIG. 3 shows the appearance of the suction check valve 70 after being assembled.

The suction check valve 70 includes a valve main body 72 fitted into the cylinder 50 and having a bottomed hollow portion 72a formed inside thereof and a center hole 72b formed at the axial center in the bottom of the hollow portion 72a to communicate between the hollow portion 72a and the pump chamber 56, a ball 74, a spring 76 that provides an urging force to the ball 74, and a plug 78 that serves as a seat portion for the ball 74 and that has a center hole 79 having an inside diameter that is smaller than the outside diameter of the ball 74. FIG. 2 illustrates how the suction check valve 70 is assembled. FIG. 3 shows the appearance of the suction check valve 70 after being assembled. As shown in the drawing, the suction check valve 70 is assembled by sequentially inserting the spring 76 and the ball 74 into the hollow portion 72a of the valve main body 72, and press-fitting the plug 78 into the hollow portion 72a. The plug 78 is formed as a flanged cylindrical member including a cylindrical portion 78a having an outside diameter that allows the plug 78 to be press-fitted into the hollow portion 72a of the valve main body 72, and a flange portion 78b that extends in the radial direction from the end edge of the cylindrical portion 78a. The strainer 90 is attached so as to cover the end surface of the flange portion 78b.

Figure 4:
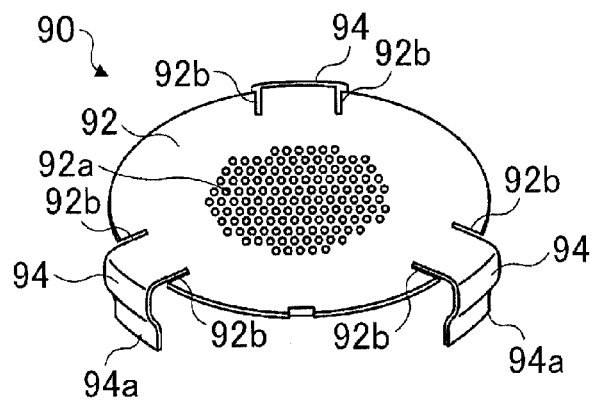
FIG. 4 shows the appearance of a strainer 90.

FIG. 4 shows the appearance of the strainer 90. As shown in the drawing, the strainer 90 is composed of a disk portion 92, in the center region of which a large number of pores 92a are formed to form a strainer surface, and three leg portions 94 provided at angular intervals of 120 degrees with respect to each other to extend from the outer peripheral edge of the disk portion 92 in the orthogonal direction. The disk portion 92 is formed with six notched grooves 92b that extend in the radial direction. The leg portions 94 are bent from the notched grooves 92b to extend in the orthogonal direction. The distal ends of the leg portions 94 are bent inward to form clips 94a. Therefore, when the strainer 90 is placed over the flange portion 78b such that the three leg portions 94 surround the outer peripheral surface of the flange portion 78b as shown in FIG. 3, the clips 94a are engaged with a stepped portion between the flange portion 78b and the cylindrical portion 78a, preventing the strainer 90 from slipping off. The leg portions 94 of the strainer 90 are adjusted in length such that a slight clearance is secured between the respective abutment surfaces of the disk portion 92 and the flange portion 78b when the strainer 90 is attached to the plug 78. In the embodiment, the suction check valve 70 and the strainer 90 are assembled in this way to form a sub-assembly (see FIG. 3).

The suction check valve 70 opens with the spring 76 compressed and the ball 74 moved away from the center hole 79 of the plug 78 when the pressure difference (P1−P2) between the input-side pressure P1 and the output-side pressure P2 is equal to or more than a predetermined pressure to overcome the urging force of the spring 76. The suction check valve 70 closes with the spring 76 expanded and the ball 74 pressed against the center hole 79 of the plug 78 to block the center hole 79 when the pressure difference (P1−P2) discussed above is less than the predetermined pressure.

Figure 5:
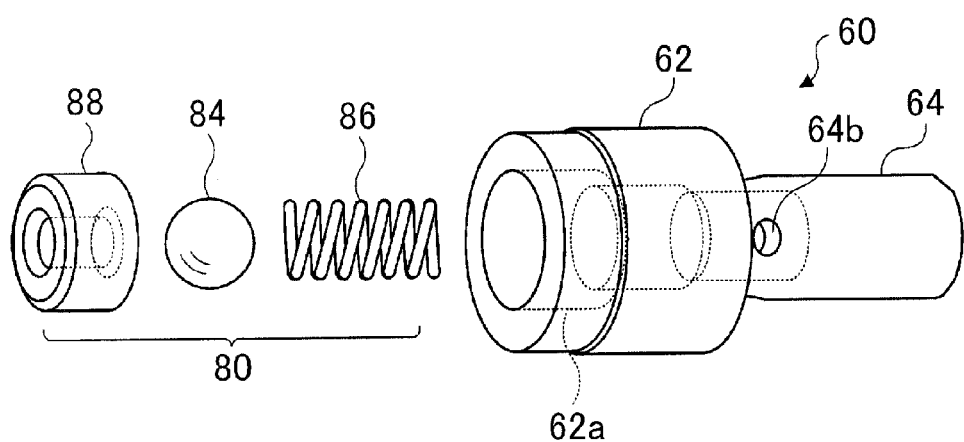
FIG. 5 illustrates how a discharge check valve 80 is assembled to a piston 60.
Figure 6:
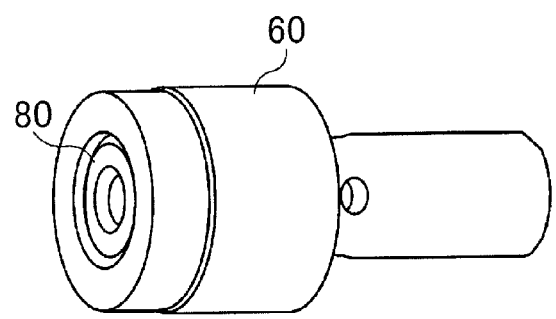
FIG. 6 shows the appearance of the discharge check valve 80 and the piston 60 after being assembled.

The discharge check valve 80 includes a ball 84, a spring 86 that provides an urging force to the ball 84, and a plug 88 formed as an annular member with a center hole 89 having an inside diameter that is smaller than the outside diameter of the ball 84. FIG. 5 illustrates how the discharge check valve 80 is assembled. FIG. 6 shows the appearance of the discharge check valve 80 after being assembled. As shown in the drawing, the discharge check valve 80 is assembled by sequentially inserting the spring 86 and the ball 84 into the hollow portion 62a of the piston 60, and press-fitting the plug 88 into the hollow portion 62a. The plug 88 may be fixed to the piston 60 by a fixing member such as a snap ring. In the embodiment, the discharge check valve 80 is assembled to the piston 60 in this way to form a sub-assembly (see FIG. 6).

The discharge check valve 80 opens with the spring 86 compressed and the ball 84 moved away from the center hole 89 of the plug 88 when the pressure difference (P2−P3) between the input-side pressure (pressure on the output side of the suction check valve 70) P2 and the output-side pressure P3 is equal to or more than a predetermined pressure to overcome the urging force of the spring 86. The discharge check valve 80 closes with the spring 86 expanded and the ball 84 pressed against the center hole 89 of the plug 88 to block the center hole 89 when the pressure difference (P2−P3) discussed above is less than the predetermined pressure.

In the cylinder 50, the pump chamber 56 is formed as a space surrounded by an inner wall 51, the distal-end surface of the piston 60, and a surface of the suction check valve 70 on the spring 46 side. When the piston 60 is moved by the urging force of the spring 46, the volume inside the pump chamber 56 is expanded to open the suction check valve 70 and close the discharge check valve 80 to suck working oil via the suction port 42. When the piston 60 is moved by the electromagnetic force of the solenoid portion 30, the volume inside the pump chamber 56 is reduced to close the suction check valve 70 and to open the discharge check valve 80 to discharge the sucked working oil via the discharge port 44.

The cylinder 50 is formed with a step between an inner wall 52, over which the piston main body 62 slides, and an inner wall 54, over which the shaft portion 64 slides. The discharge port 44 is formed at the stepped portion. The stepped portion forms a space surrounded by an annular surface of the stepped portion between the piston main body 62 and the shaft portion 64, and the outer peripheral surface of the shaft portion 64. The space is formed on the opposite side of the piston main body 62 from the pump chamber 56. Thus, the volume of the space is reduced when the volume of the pump chamber 56 is expanded, and expanded when the volume of the pump chamber 56 is reduced. In this event, variations in volume of the space are smaller than variations in volume of the pump chamber 56 because the area (pressure receiving area) over which the piston 60 receives a pressure from the pump chamber 56 side is larger than the area (pressure receiving area) over which the piston 60 receives a pressure from the discharge port 44 side. Therefore, the space serves as a second pump chamber 58. That is, when the piston 60 is moved by the urging force of the spring 46, an amount of working oil corresponding to the amount of expansion in volume of the pump chamber 56 is sucked from the suction port 42 into the pump chamber 56 via the suction check valve 70, and an amount of working oil corresponding to the amount of reduction in volume of the second pump chamber 58 is discharged from the second pump chamber 58 via the discharge port 44. When the piston 60 is moved by the electromagnetic force of the solenoid portion 30, an amount of working oil corresponding to the amount of reduction in volume of the pump chamber 56 is fed from the pump chamber 56 into the second pump chamber 58 via the discharge check valve 80, and an amount of working oil corresponding to the difference between the amount of reduction in volume of the pump chamber 56 and the amount of expansion in volume of the second pump chamber 58 is discharged via the discharge port 44. Thus, working oil is discharged from the discharge port 44 twice while the piston 60 moves back and forth once, which makes it possible to reduce discharge non-uniformities and improve the discharge performance.

Figure 7:
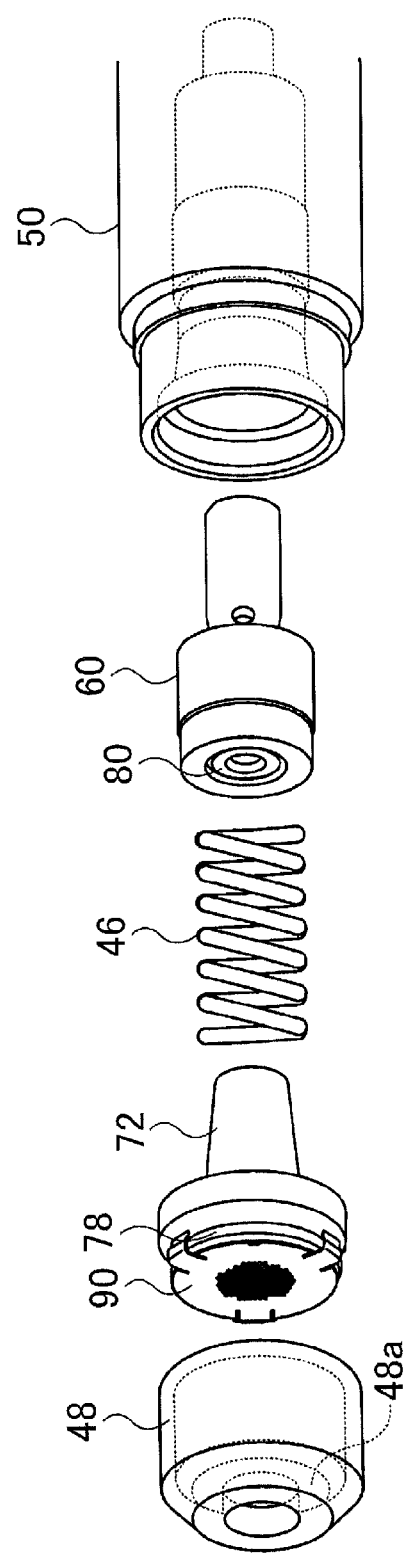
FIG. 7 illustrates how the piston 60, the discharge check valve 80, a spring 46, the suction check valve 70, and the strainer 90 are assembled to a cylinder 50.

FIG. 7 illustrates how the electromagnetic pump 20 according to the embodiment is assembled. The electromagnetic pump 20 according to the embodiment is assembled by sequentially inserting the sub-assembly of the piston 60 and the discharge check valve 80, the spring 46, and the sub-assembly of the suction check valve 70 and the strainer 90 into the cylinder 50, and thereafter attaching the cylinder cover 48. The outer peripheral surface of the cylinder 50 and the inner peripheral surface of the cylinder cover 48 are engraved with spiral threads (not shown), and the cylinder cover 48 is attached by placing the cylinder cover 48 over the cylinder 50 and screwing the cylinder cover 48. When the cylinder cover 48 is attached, the outer peripheral edge of the strainer 90 is pressed by an annular pressing surface 48a of the cylinder cover 48 to fix the strainer 90.

In the electromagnetic pump 20 according to the embodiment described above, the strainer 90 is formed from the disk portion 92 in which a strainer surface is formed, and the leg portions 94 which extend from the outer peripheral edge of the disk portion 92 in the orthogonal direction, the strainer 90 is placed over the plug 78 of the suction check valve 70 to form a sub-assembly of the suction check valve 70 and the strainer 90, and the electromagnetic pump 20 is assembled by sequentially inserting the piston 60, the spring 46, and the sub-assembly of the suction check valve 70 and the strainer 90 into the cylinder 50, and thereafter attaching the cylinder cover 48. Thus, with the electromagnetic pump 20 according to the embodiment, the strainer 90 can be assembled and aligned easily to improve the ease of assembly of the electromagnetic pump 20 even if the strainer 90 is small in size. Moreover, the clips 94a which are bent inward are formed at the distal end of the leg portions 94 of the strainer 90. This prevents the strainer 90 from slipping off when the strainer 90 is attached to the plug 78. Further, the leg portions 94 are adjusted in length such that a slight clearance is secured between the respective abutment surfaces of the strainer 90 and the flange portion 78b when the strainer 90 is attached to the plug 78 (flange portion 78b). In other words, the cylinder cover 48 is in direct contact with the disk portion 92 and the disk portion 92 is in direct contact with the flange portion 78b so that a clearance is generated between the clips 94a and the flange portion 78b in an axial direction and is generated between the clips 94a and a side surface of the flange portion 78b that is opposite from a side surface in which the disk portion 92 is provided. Thus, the outer peripheral edge of the strainer 90 can be pressed with a uniform pressure to be fixed by the pressing surface 48a of the cylinder cover 48 when the cylinder cover 48 is attached with the sub-assembly of the suction check valve 70 and the strainer 90 disposed inside the cylinder 50. In addition, the notched grooves 92b are formed in the disk portion 92 of the strainer 90, and the leg portions 94 are formed to extend from the notched grooves 92b. Thus, the leg portions 94 can be easily shaped to extend in the direction orthogonal to the disk portion 92.

In the electromagnetic pump 20 according to the embodiment, the discharge check valve 80 is assembled to the piston 60 in advance to form a sub-assembly, and then the piston 60 and the discharge check valve 80 are disposed inside the cylinder 50. Thus, the ease of assembly of the electromagnetic pump 20 can be further improved.

In the electromagnetic pump 20 according to the embodiment, the strainer 90 is formed with three leg portions 94. However, the strainer 90 may be formed with any plural number of leg portions such as four or five leg portions.

In the electromagnetic pump 20 according to the embodiment, the strainer 90 is formed with the leg portions 94 such that the three leg portions 94 surround the outer peripheral surface of the plug 78. However, the strainer 90 may be formed with a sidewall so as to completely cover the outer peripheral surface of the plug 78.

In the electromagnetic pump 20 according to the embodiment, the clips 94a which are bent inward are provided at the distal end of the leg portions 94 of the strainer 90. However, the clips 94a may not be provided.

In the electromagnetic pump 20 according to the embodiment, the strainer 90 is attached to the suction check valve 70 in advance to form a sub-assembly, which is then assembled into the cylinder 50. However, the strainer 90 and the suction check valve 70 may be separately assembled to the cylinder 50.

In the electromagnetic pump 20 according to the embodiment, the leg portions 94 of the strainer 90 are adjusted in length such that a slight clearance is secured between the respective abutment surfaces of the strainer 90 and the flange portion 78b when the strainer 90 is attached to the plug 78 (flange portion 78b). However, no such clearance may be secured.

In the electromagnetic pump 20 according to the embodiment, the notched grooves 92b are formed in the disk portion 92 of the strainer 90. However, the notched grooves 92b may not be formed.

In the electromagnetic pump 20 according to the embodiment, the discharge check valve 80 is built in the piston 60 in advance to form a sub-assembly, which is then assembled into the cylinder 50. However, the discharge check valve 80 and the piston 60 may be separately assembled to the cylinder 50. In the electromagnetic pump 20 according to the embodiment, in addition, the discharge check valve 80 is built in the piston 60. However, the discharge check valve 80 may not be built in the piston 60, and may be incorporated in a valve body outside the cylinder 50, for example.

The electromagnetic pump 20 according to the embodiment is configured such that working oil is discharged from the discharge port 44 twice while the piston 60 moves back and forth once. However, the present invention is not limited thereto, and the electromagnetic pump 20 according to the embodiment may be any type of electromagnetic pump that can discharge a working fluid as the piston moves back and forth, such as a type in which working oil is sucked from the suction port into the pump chamber when the piston is moved forward by the electromagnetic force from the solenoid portion and the working oil in the pump chamber is discharged from the discharge port when the piston is moved backward by the urging force of the spring, and a type in which working oil is sucked from the suction port into the pump chamber when the piston is moved backward by the urging force of the spring and the working oil in the pump chamber is discharged from the discharge port when the piston is moved forward by the electromagnetic force from the solenoid portion.

The electromagnetic pump 20 according to the embodiment is used for a hydraulic control device that hydraulically drives clutches and brakes of an automatic transmission mounted on an automobile. However, the present invention is not limited thereto, and the electromagnetic pump 20 according to the embodiment may be applied to any system that transports fuel, transports a liquid for lubrication, or the like.

Here, the correspondence between the main elements of the embodiment and the main elements of the invention described in the "SUMMARY OF THE INVENTION" section will be described. In the embodiment, the cylinder 50 corresponds to the "cylinder". The piston 60 corresponds to the "piston". The solenoid portion 30 corresponds to the "electromagnetic portion". The spring 46 corresponds to the "urging member". The strainer 90 corresponds to the "strainer member". The suction check valve 70 corresponds to the "suction check valve". The flange portion 78b of the plug 78 corresponds to the "placement portion". The cylinder cover 48 corresponds to the "cover member". The plug 78 corresponds to the "stepped tubular member". The valve main body 72 corresponds to the "main body". The spring 76 corresponds to the "second urging member". The plug 78 also corresponds to the "plug". The correspondence between the main elements of the embodiment and the main elements of the invention described in the "SUMMARY OF THE INVENTION" section does not limit the elements of the invention described in the "SUMMARY OF THE INVENTION" section, because the embodiment is an example given for the purpose of specifically describing the best mode for carrying out the invention described in the "SUM- MARY OF THE INVENTION" section. That is, the invention described in the "SUMMARY OF THE INVENTION" section should be construed on the basis of the description in that section, and the embodiment is merely a specific example of the invention described in the "SUMMARY OF THE INVENTION" section.

While a mode for carrying out the present invention has been described above by way of an embodiment, it is a matter of course that the present invention is not limited to the embodiment in any way, and that the present invention may be implemented in various forms without departing from the scope and spirit of the present invention.

The present invention is applicable to the electromagnetic pump manufacturing industry and so forth.

The invention claimed is:

1. An electromagnetic pump in which a piston moves back and forth within a cylinder to pump a working fluid, comprising:
    an electromagnetic portion that generates an electromagnetic force for pressing the piston;
    an urging member that urges the piston in a direction opposite to the electromagnetic force;
    a strainer member including a disk-shaped portion which has a disk shape and in which a strainer surface is formed, and having a side portion that extends from an outer peripheral edge of the disk-shaped portion;
    a suction check valve including a placement portion which is formed in a tubular shape and over which the strainer member is placed such that the side portion surrounds a tube side surface, the suction check valve being capable of sucking the working fluid via the strainer surface; and
    a cover member that covers an end portion of the cylinder, wherein
    the side portion is formed as a plurality of leg portions provided at predetermined intervals around a circumference of the strainer member and configured to surround the tube side surface of the placement portion,
    the leg portions are configured with clips at distal ends of the leg portions, the clips configured to bend inwardly of the tube surface so as to clip to the tube side surface,
    the piston, the urging member, the suction check valve, and the strainer member are sequentially inserted into the cylinder from a side opposite to the electromagnetic portion, and the cover member is attached so as to press the strainer surface, and
    the cover member is in direct contact with the disk-shaped portion and the disk-shaped portion is in direct contact with the placement portion so that a clearance is generated between the clips and the placement portion in an axial direction and is generated between the clips and a side surface of the placement portion that is opposite from a side surface in which the disk-shaped portion is provided.

2. The electromagnetic pump according to claim 1, wherein
    the strainer member is disposed inside the cylinder with the strainer member assembled to the suction check valve.

3. The electromagnetic pump according to claim 2, wherein:
    the suction check valve includes a stepped tubular member formed with a first tubular member that is tubular, and a second tubular member that is tubular and that is formed with the placement portion, the second tubular member being larger in outside diameter than the first tubular member; and
    the strainer member is assembled to the suction check valve with the clips engaged with a step of the stepped tubular member.

4. The electromagnetic pump according to claim 3, wherein
    the clips of the strainer member are engaged with the step of the stepped tubular member with a predetermined clearance provided in a direction orthogonal to a surface of the disk-shaped portion.

5. The electromagnetic pump according to claim 1, wherein:
    the suction check valve includes a main body that has a hollow portion and that supports the urging member with a piston-side surface, a ball and a second urging member disposed in the hollow portion, and a plug that serves as a seat portion for the ball and that is press-fitted into the hollow portion with the ball and the second urging member disposed in the hollow portion; and
    the placement portion is formed on the plug.

6. The electromagnetic pump according to claim 1, further comprising:
    a discharge check valve that is built in the piston and that is capable of discharging the working fluid sucked via the suction check valve, wherein
    the piston is disposed in the cylinder with the discharge check valve assembled to the piston.

7. The electromagnetic pump according to claim 1, wherein:
    the disk-shaped portion is formed with notched grooves that extend in a radial direction from the outer peripheral edge; and
    the leg portions are formed to extend from the notched grooves.

8. The electromagnetic pump according to claim 1, wherein the cover member is screwed over the cylinder, and the suction check valve is fixed in place between the cover member and the cylinder.

* * * * *